(12) United States Patent
Jorgensen

(10) Patent No.: US 8,891,230 B1
(45) Date of Patent: Nov. 18, 2014

(54) TABLET COMPUTER PROTECTOR AND COVERING ASSEMBLY

(76) Inventor: Brett E. Jorgensen, Sioux Falls, SD (US)

(*) Notice: Subject to any disclaimer, the term of this patent is extended or adjusted under 35 U.S.C. 154(b) by 163 days.

(21) Appl. No.: 13/550,777

(22) Filed: Jul. 17, 2012

(51) Int. Cl.
  *G06F 1/16* (2006.01)
  *H05K 5/00* (2006.01)
  *H05K 7/00* (2006.01)
  *F16M 11/00* (2006.01)

(52) U.S. Cl.
  USPC ..................... 361/679.02; 248/682

(58) Field of Classification Search
  CPC ......... F21L 15/08; F21V 21/14; A47G 29/08; A45D 27/29; A45F 5/02; A47F 5/112
  USPC ....................................... 206/45.25
  See application file for complete search history.

(56) References Cited

U.S. PATENT DOCUMENTS

| | | | |
|---|---|---|---|
| 5,100,098 A * | 3/1992 | Hawkins | 248/291.1 |
| 6,108,213 A * | 8/2000 | Yamamoto et al. | 361/784 |
| 7,216,448 B2 * | 5/2007 | Hsu | 40/725 |
| 7,907,394 B2 * | 3/2011 | Richardson et al. | 361/679.3 |
| 8,028,794 B1 | 10/2011 | Freeman | |
| 8,208,245 B2 * | 6/2012 | Staats et al. | 361/679.02 |
| 8,467,183 B2 * | 6/2013 | Probst et al. | 361/679.55 |
| 8,467,185 B2 * | 6/2013 | Probst et al. | 361/679.55 |
| 2006/0061950 A1 * | 3/2006 | Richardson et al. | 361/683 |
| 2006/0226039 A1 | 10/2006 | Goradesky | |
| 2008/0237432 A1 | 10/2008 | Patterson | |
| 2009/0079723 A1 * | 3/2009 | Wang et al. | 345/212 |
| 2010/0000890 A1 * | 1/2010 | Belden et al. | 206/307 |
| 2010/0219320 A1 * | 9/2010 | Knych | 248/440.1 |
| 2011/0031287 A1 | 2/2011 | LeGette et al. | |
| 2011/0133050 A1 * | 6/2011 | Eisenberger et al. | 248/551 |
| 2011/0204843 A1 | 8/2011 | Foster | |
| 2011/0221319 A1 | 9/2011 | Law et al. | |
| 2011/0267757 A1 * | 11/2011 | Probst et al. | 361/679.09 |
| 2011/0297578 A1 * | 12/2011 | Stiehl et al. | 206/701 |
| 2011/0298345 A1 * | 12/2011 | Shortt et al. | 312/237 |
| 2012/0012483 A1 * | 1/2012 | Fan | 206/320 |
| 2012/0087100 A1 * | 4/2012 | Ku | 361/807 |
| 2012/0097831 A1 | 4/2012 | Olukotun et al. | |
| 2012/0110354 A1 * | 5/2012 | Liu | 713/300 |
| 2012/0223194 A1 * | 9/2012 | Huang et al. | 248/176.1 |
| 2012/0325838 A1 * | 12/2012 | Huang | 220/810 |
| 2013/0020216 A1 * | 1/2013 | Chiou | 206/320 |
| 2014/0009404 A1 * | 1/2014 | Pan | 345/173 |

FOREIGN PATENT DOCUMENTS

| | | |
|---|---|---|
| AU | 2011101523 | 11/2011 |
| DE | 202012100042 | 5/2012 |
| WO | 2012016158 | 2/2012 |
| WO | 2012018373 | 2/2012 |

* cited by examiner

*Primary Examiner* — Hoa C Nguyen
*Assistant Examiner* — Xanthia C Cunningham

(57) ABSTRACT

A tablet computer protector and covering assembly includes a panel that having a top side and a bottom side and a perimeter wall attached to the top side. The perimeter wall extends around a receiving space for receiving a tablet computer. A covering includes a back cover, a front cover and a medial section attached to and positioned between the front and back covers. The medial section is pivotable with respect to the front and back covers to allow closing or opening of the covering. The back cover and the front cover each have an inner surface and an outer surface. The inner surfaces face each other when the covering is in the closed position. A coupler releasably couples the tablet computer receiver to the back cover such that the bottom side faces the inner surface.

10 Claims, 10 Drawing Sheets

TABLET COMPUTER PROTECTOR AND COVERING ASSEMBLY

BACKGROUND OF THE DISCLOSURE

Field of the Disclosure

The disclosure relates to tablet computer holders and more particularly pertains to a new tablet computer holder for holding, covering and protecting a tablet computer.

SUMMARY OF THE DISCLOSURE

An embodiment of the disclosure meets the needs presented above by generally comprising a tablet computer receiver including a panel that has a top side, a bottom side, a first lateral edge, a second lateral edge, a first end edge and a second end edge and a perimeter wall attached to the top side that is coextensive with a perimeter edge of the panel. The perimeter wall extends around a receiving space configured for receiving a tablet computer. The perimeter wall has an interior surface, an exterior surface and an upper surface. A covering includes a back cover, a front cover and a medial section attached to and positioned between the front and back covers. The medial section is pivotable with respect to the front and back covers to facilitate closing or opening of the covering. The back cover and the front cover each have an inner surface and an outer surface. The inner surfaces face each other when the covering is in the closed position. A coupler releasably couples the tablet computer receiver to the back cover such that the bottom side faces the inner surface. The coupler comprises a mechanical coupler.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
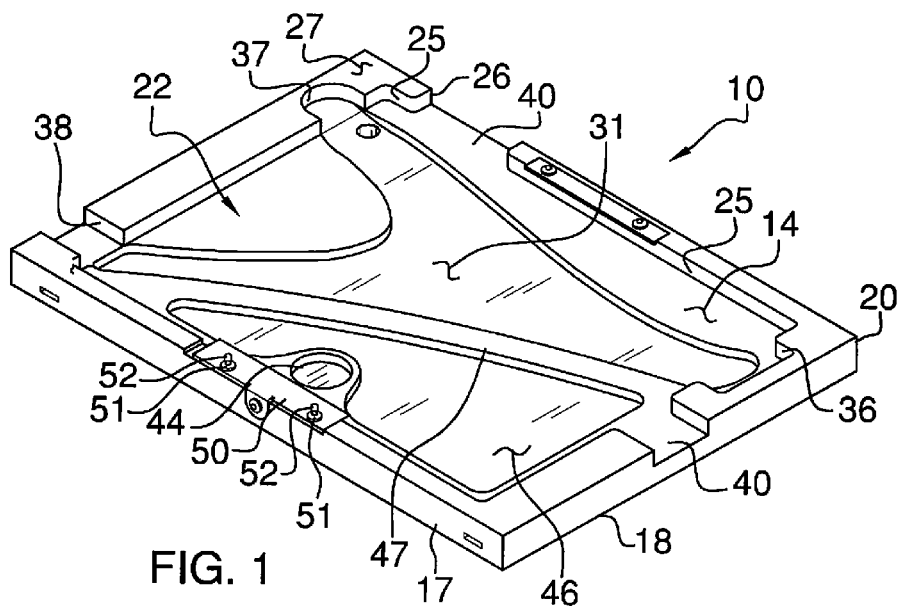
FIG. 1 is a top perspective view of a tablet computer protector and covering assembly according to an embodiment of the disclosure.
Figure 2:
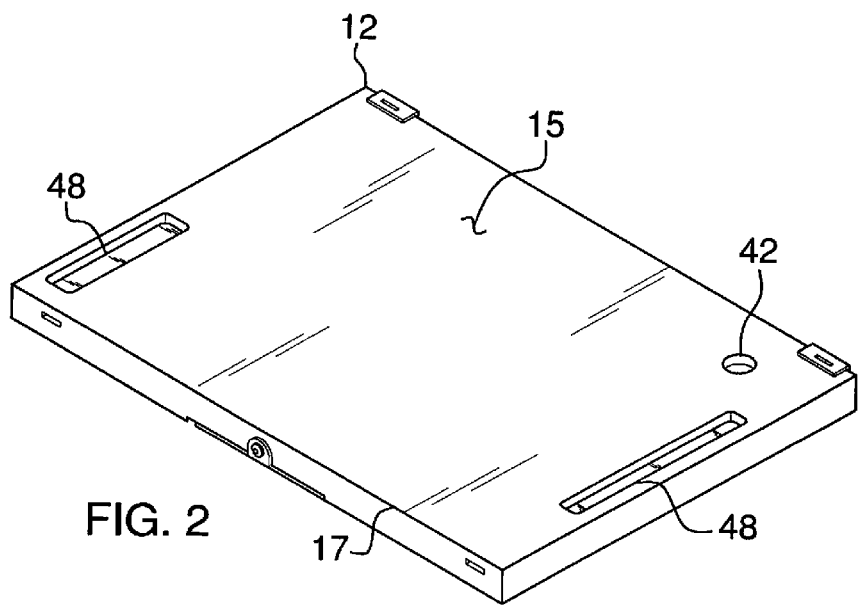
FIG. 2 is a bottom perspective view of an embodiment of the disclosure.
Figure 3:
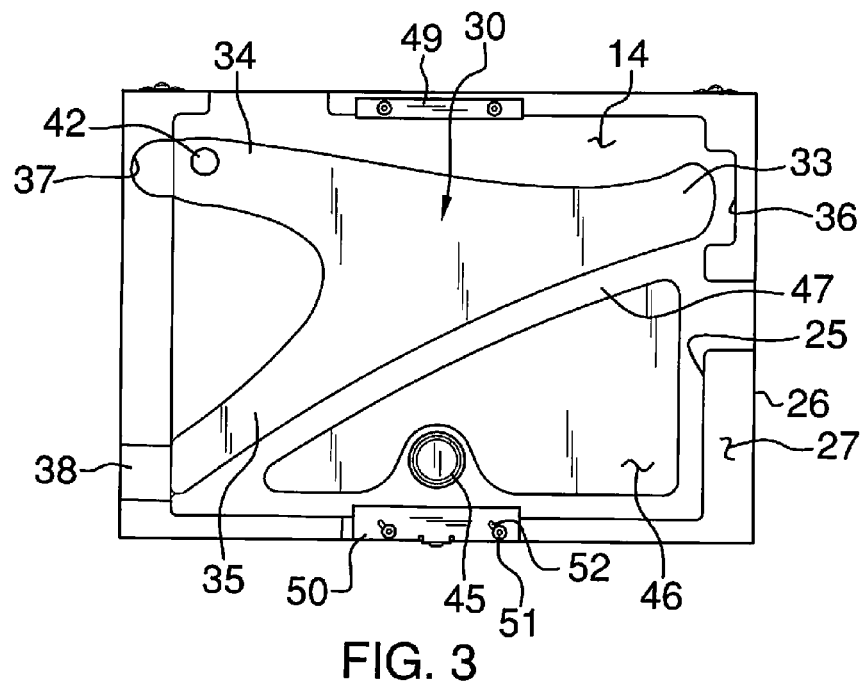
FIG. 3 is a top view of an embodiment of the disclosure.
Figure 4:
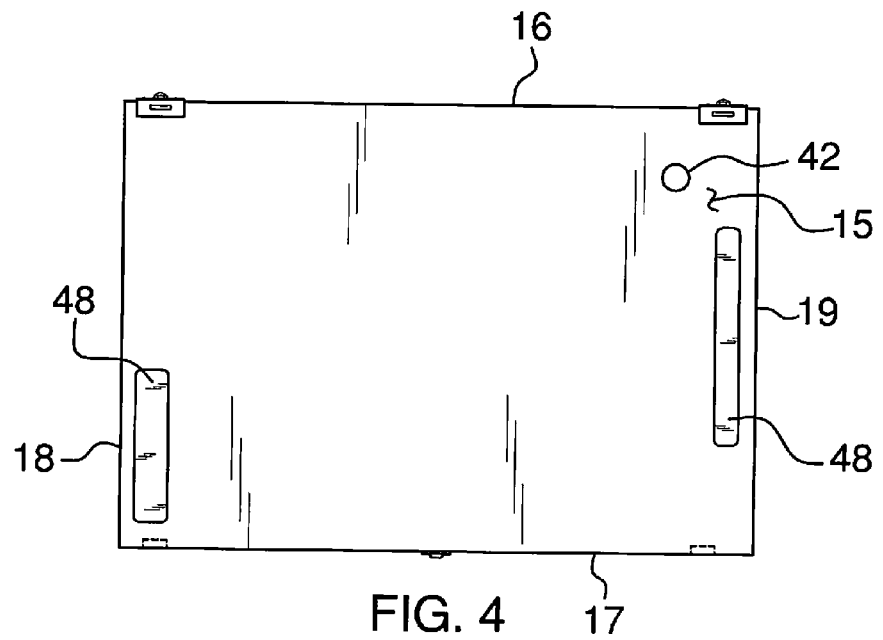
FIG. 4 is a bottom view of an embodiment of the disclosure.
Figure 5:
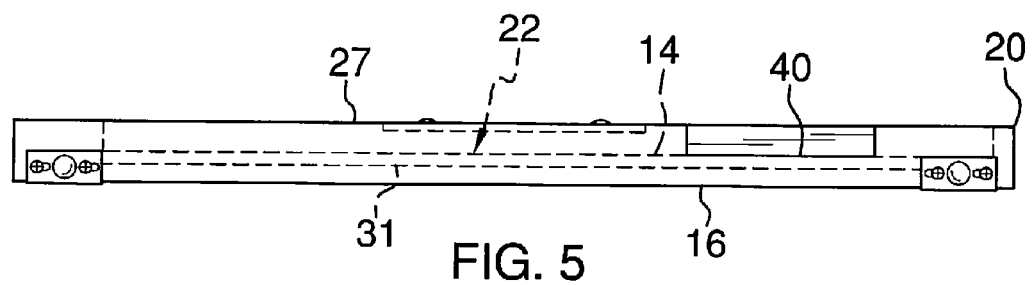
FIG. 5 is a right side view of an embodiment of the disclosure.
Figure 6:
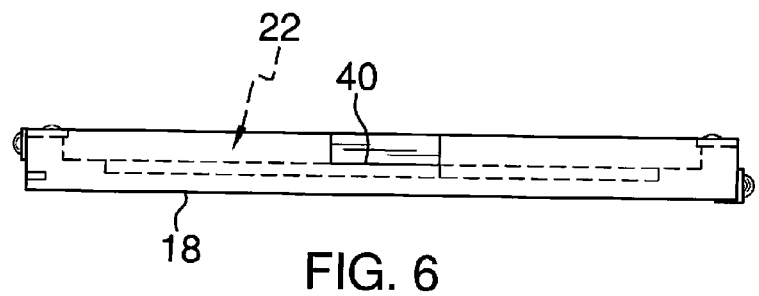
FIG. 6 is an end view of an embodiment of the disclosure.
Figure 7:
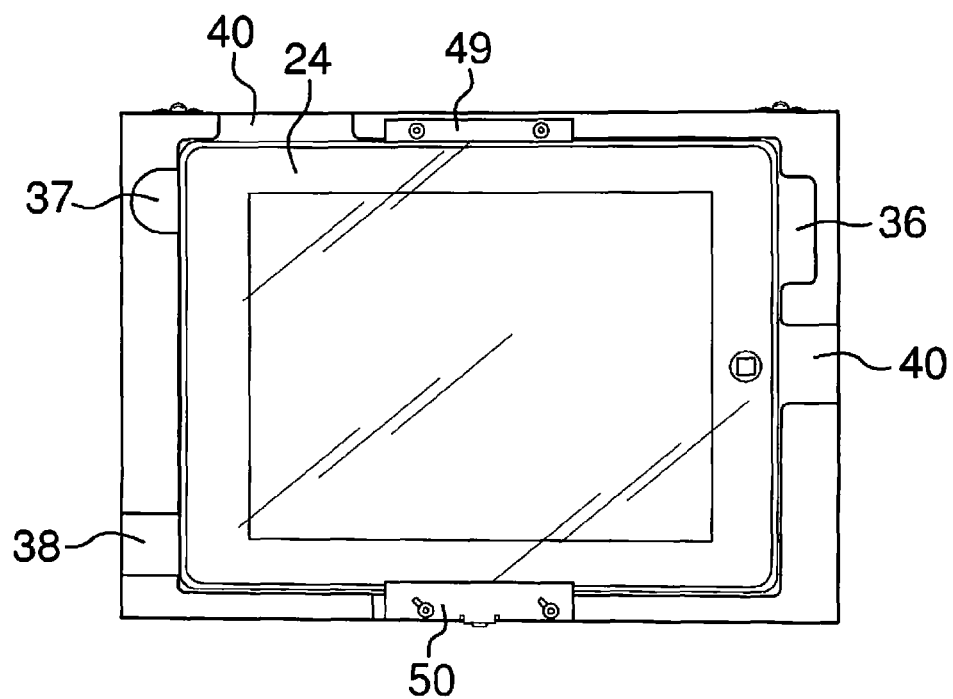
FIG. 7 is a top in-use view of an embodiment of the disclosure.
Figure 8:
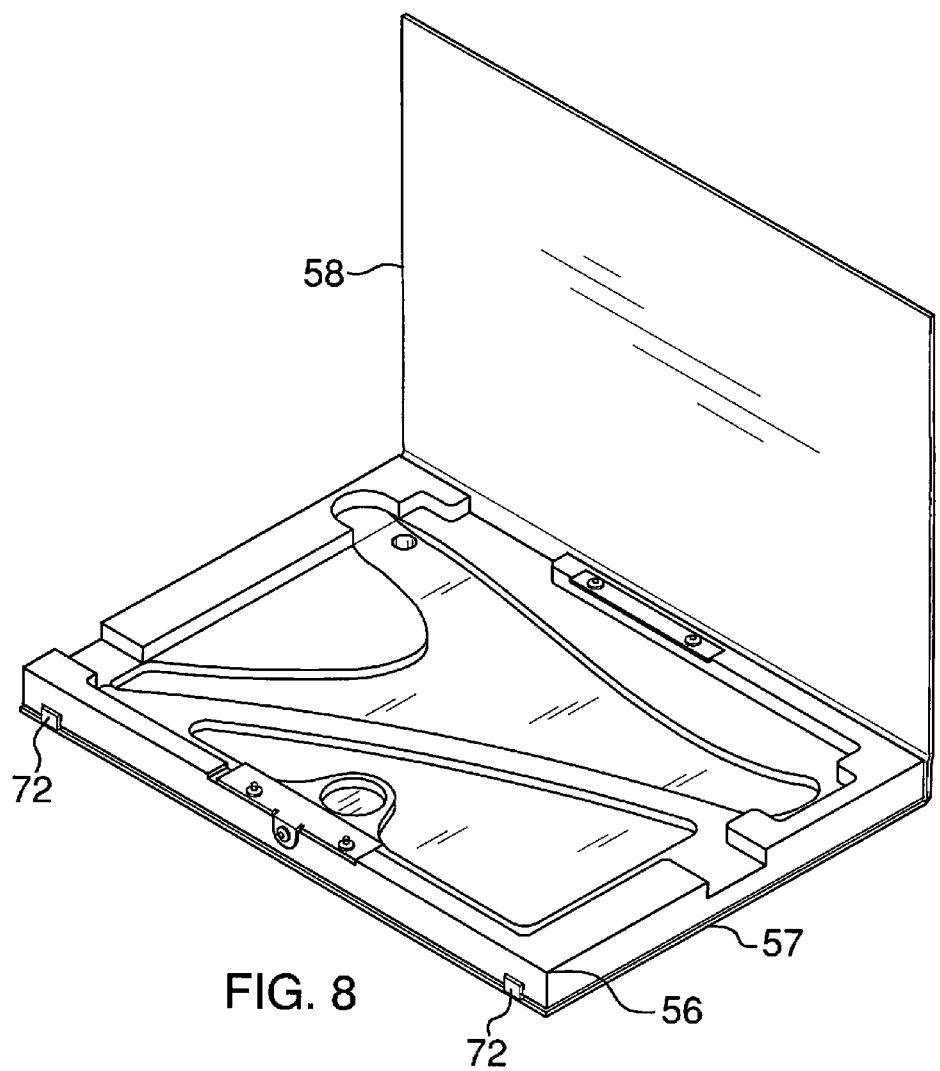
FIG. 8 is a top perspective view of an embodiment of the disclosure.
Figure 9:
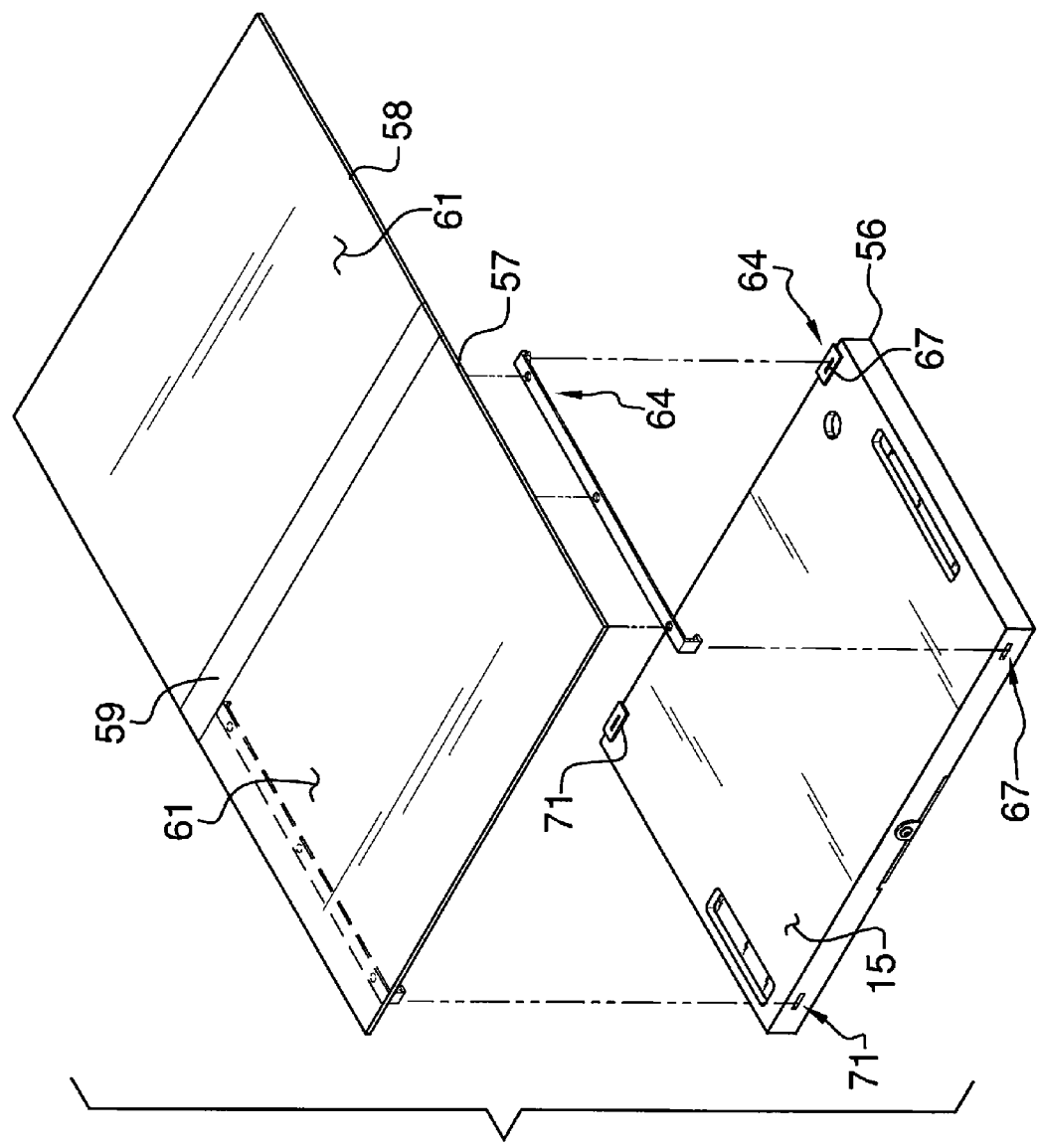
FIG. 9 is an exploded rear perspective view of an embodiment of the disclosure.
Figure 10:
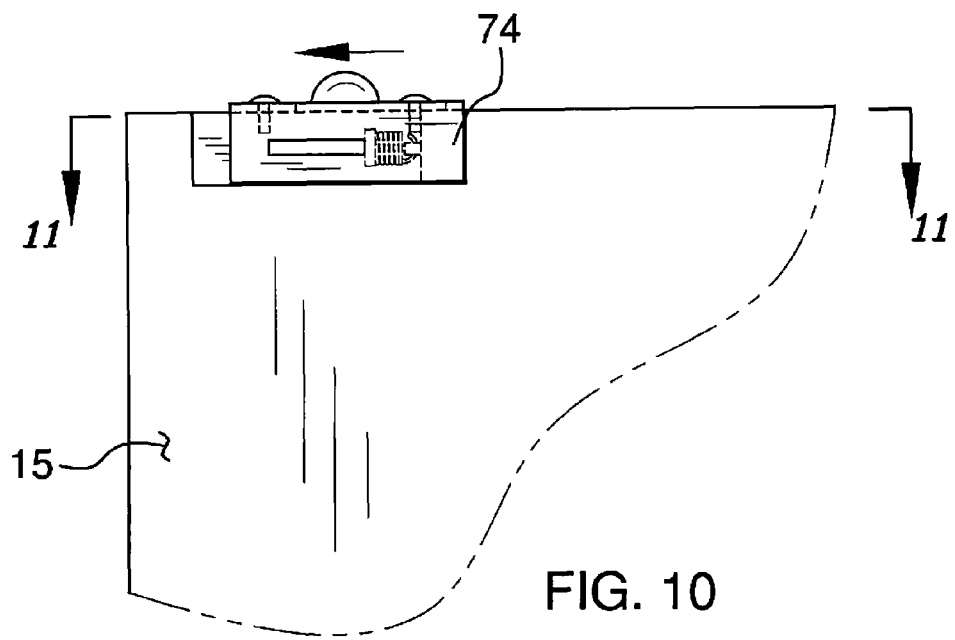
FIG. 10 is a bottom broken view of an embodiment of the disclosure.

With reference now to the drawings, and in particular to FIGS. 1 through 6 thereof, a new tablet computer holder embodying the principles and concepts of an embodiment of the disclosure and generally designated by the reference numeral 10 will be described.

As best illustrated in FIGS. 1 through 6, the tablet computer protector and covering assembly 10 generally comprises a panel 12 that has a top side 14, a bottom side 15, a first lateral edge 16, a second lateral edge 17, a first end edge 18 and a second end edge 19. The terms "top," "bottom," etc. are being used for illustrative purposes only as it should be understood that the panel 12 may be orientated in any desired direction. A perimeter wall 20 is attached to the top side 14 and is coextensive with a perimeter edge of the panel 12. The perimeter wall 20 extends around a receiving space 22 for receiving a tablet computer 24. The term "tablet computer" is generally defined as a mobile computer having a touch screen and which is typically employs a virtual keyboard as opposed to a physical keyboard, though physical keyboards are typically capable of being coupled to such tablets. One example of a tablet computer would be an iPad manufactured by Apple Inc. with headquarters located at 1 Infinite Loop, Cupertino, Calif. It should be understood that while the assembly 10 could be used with a mobile phone, the assembly 10 provides for greater protection of the tablet computer than would be required by a mobile phone. The perimeter wall 20 has an interior surface 25, an exterior surface 26 and an upper surface 27. The panel 12 and the perimeter 20 wall may comprise a wood material and the perimeter wall 20 and the panel 12 are non-removably coupled to each other. More particularly, the panel 12 and perimeter wall 20 may be formed out of a single piece of wood material (or portions of wood material bonded together) with a router as would be advantageous with computer numeric control (CNC) tool techniques. Wood materials may be beneficial over other materials based on the ability of wood to provide higher quality sound reflection and amplification of bass tones.

The top side 14 of the panel 12 has a channel 30 extending downwardly therein but which is spaced from the bottom side 16. The receiving space 22 is defined as between the top side 14 and the upper surface 27 such that the tablet computer 24 will be spaced from a bottom 31 of the channel 30 such that sound may travel under the tablet computer 24 and through the channel 30. The channel 30 includes a plurality of arms and in particular a first arm 33, a second arm 34 and a third arm 35 in fluid communication with each other and extending from a central area of the panel 12 and towards the perimeter wall 20. A central portion of the channel 30 may be positioned nearer to the first lateral edge 16 than to the second lateral edge 17. More specifically, the first arm 33 may extend toward the first end edge 18 and be positioned nearer the first lateral edge 16 than the second lateral edge 17. The perimeter wall 20 has a first sound notch 36 therein in fluid communication with the first arm 33 and extending into the interior 25 and upper 27 surfaces. The second arm 34 may extend toward the second end edge 19 and be positioned nearer the first lateral edge 16 than the second lateral edge 17. The perimeter wall 20 has a second sound notch 37 therein in fluid communication with the second arm 34 and extending into the interior 25 and upper 27 surfaces. The third arm 35 may extend toward the second end edge 19 and be positioned nearer the second lateral edge 17 than the first lateral edge 16. The perimeter wall 20 has a third sound notch 38 therein in fluid communication with the third arm 35 and extending into the interior 25 and upper 27 surfaces. The third sound notch 38 may further extend through the exterior surface 26. The first 36, second 37 and third 38 sound notches allow sound from the tablet computer 24 to escape the channel 30. More particularly, at least the first 36 and second 37 sound notches may retain the adjacent exterior surfaces 26 intact to facilitate deflection of the sound upwardly from the top side 14.

Some of the sound notches, such as the third sound notch 38, may further include the exterior surface 26 removed to allow access to a port or actuator on the tablet computer 24. The perimeter wall 20 may further have a plurality of access slots 40 therein. Each of the access slots 40 extends downwardly into the upper surface 27 and through adjacent ones of the interior 25 and exterior 26 surfaces. The access slots 40 facilitate further access to the tablet computer 24. One of the access slots 40 may be positioned adjacent to the first end edge 18 and one of the access slots 40 may be positioned adjacent to the first lateral edge 16. Furthermore, the panel 12 may have a camera opening 42 therein extending through the top 14 and bottom 15 sides. This will be positioned depending on location of a camera lens positioned on a backside of the tablet computer 24. The camera opening 42 will typically have a largest diameter is less than 3.0 cm and which may be less than 2.0 cm.

The top side 14 has a well 44 extending therein. A spring 45 is positioned within the well 44 and urges the tablet computer 24 upwardly away from the top side 14. This will assist a person in removing the tablet computer 24 from the panel 12. The well 44 may be placed anywhere on the panel 12, though it may be beneficial to space it away from the channel 30, such as adjacent to the second lateral edge 17, to avoid any sound deflection by the spring 45 or a peripheral wall of the well 44. As can be seen in FIG. 1, a depression 46 may be formed in the top side 14 between the channel 30 and the second lateral edge 17. The depression 46 may at least be partially bound the well 44. The depression 46 is spaced from the channel 30 by a dividing wall 47 and reduces the overall weight of the assembly 10 by removing excess material.

A plurality of finger slots 48 extends into the bottom side 15 of the panel 12. The finger slots 48 are elongated and provide for a gripping location should a user of the assembly 10 decide to hold the panel 12 in their hands. At least one of the finger slots 48 may be positioned adjacent to and extend along the first end edge 18 and another one of the finger slots 48 may be positioned adjacent to and extending along the second end edge 19.

A plurality of brackets 49, 50 is attached to the perimeter wall 20 for releasably retaining the tablet computer 24 in the receiving space 22 and in abutment with the top side 14. More particularly, at least a pair of brackets 49, 50 is attached to the perimeter wall 20 and extends over the top side 14. One of the brackets 49 may be fixed and non-movable so that the tablet computer 24 is extendable or slid under this fixed bracket 49. One of the brackets 50 may be movable between a locking position extending over the receiving space 22 and a release position positioned away from the receiving space 22. The movable bracket 50 is positioned on fasteners 51 extending through slots 52 in the movable bracket 50 to allow the movable bracket 50 to slide relative to the fasteners 51. The brackets 49, 50 may be positioned where needed or convenient for usage of the tablet computer 24. For instance, one of the brackets 49 may be positioned adjacent to the first lateral edge 16 and one of the brackets 50 may positioned adjacent to the second lateral edge 17.

As shown in FIGS. 8-14, a covering 55 may be provided. For clarity, the panel 12 and perimeter wall 20 combination will be defined as a tablet computer receiver 56 for these Figures. The covering 55 includes a back cover 57, a front cover 58 and a medial section 59 attached to and positioned between the front 58 and back 57 covers. The medial section 59 is pivotable with respect to the front 58 and back 57 covers to facilitate closing or opening of the covering 55. The back cover 57 and the front cover 58 each have an inner surface 60 and an outer surface 61. The inner surfaces 60 face each other when the covering 55 is in the closed position. The sizes of the front 58 and back 57 covers will be such that they will be able to completely cover the top 14 and bottom 15 sides of the tablet computer receiver 56. Typically the tablet computer 24 will have a width between 5.0 inches and 9.0 inches, a height between 7.0 inches and 11.0 inches and a depth being less than 1.0 inches. The tablet computer receiver 56 will have its receiving space 22 accommodate the dimensions of the tablet computer within 0.25 inches. The thickness of the perimeter wall 20 may vary but will typically be at least 0.25 inches. The covering 55 may be comprised of any conventional material but will likely be substantially rigid. The medial section 59 will be pivotable along flex joints in the material used for the covering 55 such as is typically found with a hard-covered book. For this reason, the covering 55 may be comprised of a rigid cardboard or pressed wood material covered with an outer material such as a cloth, plastic, paper, leather or synthetic materials.

A coupler 64 releasably couples the tablet computer receiver 56 to the back cover 57 such that the bottom side 15 faces the inner surface 60. The coupler 64 is mechanical and in particular is not directed to adhesives but instead relies upon friction, latches and the like to retain the tablet computer receiver 56 on the covering 55. It should be understood that the orientation of the tablet computer receiver 56 may be altered as needed. Thus, it may be rotated 180° in FIG. 8 by simply reversing the coupler 64.

The coupler 64 includes a primary mount 66 that is attached to the inner surface 60 of the back cover 57. The primary mount 66 is non-removably coupled to the back cover 57. The tablet computer receiver 56 includes at least one primary female mating member 67 releasably engageable with the primary mount 66. More particularly, the primary mount 66 may be elongated and include a first end 68 and a second end 69 each comprising a male mating member. The tablet computer receiver 56 would therefore include a pair of primary female mating members 67 releasably engaging the first 68 and second 69 ends of the primary mount 66.

The coupler 64 may further provide a secondary mount 70 attached to the inner surface 60 of the back cover 57 which is also non-removably coupled to the back cover 57. The tablet computer receiver 56 includes at least one secondary female mating member 71 is releasably engageable with the secondary mount 70. More particularly, the secondary mount 70 is elongated and includes a first end 72 and a second end 73 each comprising a male mating member. The tablet computer receiver 56 includes a pair of secondary female mating members 71 releasably engaging the first 72 and second 73 ends of the secondary mount 70. The primary 66 and secondary 70 mounts are elongated along a line orientated perpendicular to a joining edge of the back cover 57 and the medial section 59. The primary 66 and secondary 70 mounts are spaced from each other and may be positioned adjacent to opposite edges of the back cover 57 with respect to each other.

Figure 11:
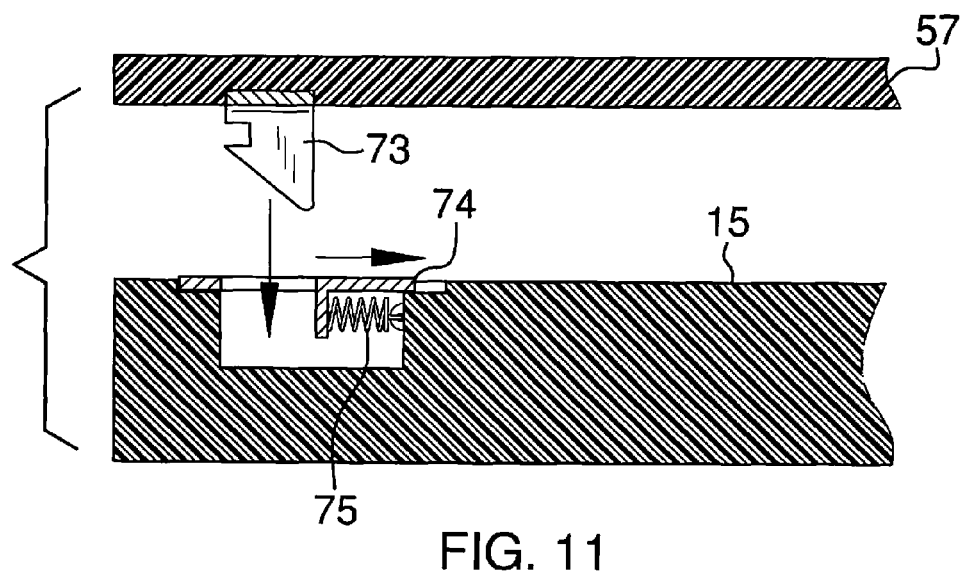
FIG. 11 is a cross-sectional view of an embodiment of the disclosure taken along line 11-11 of FIG. 10.
Figure 12:
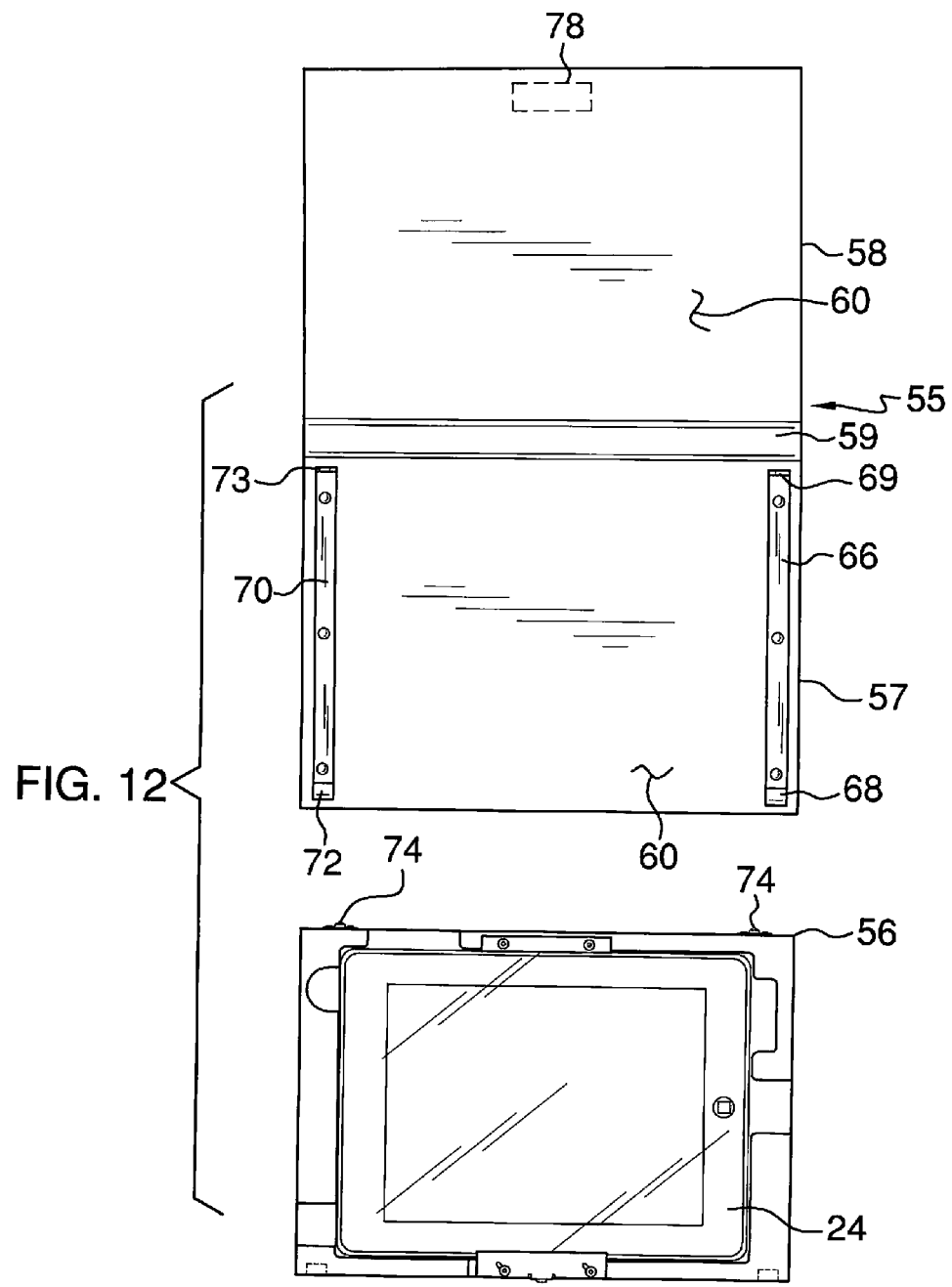
FIG. 12 is a top view of an embodiment of the disclosure.
Figure 13:
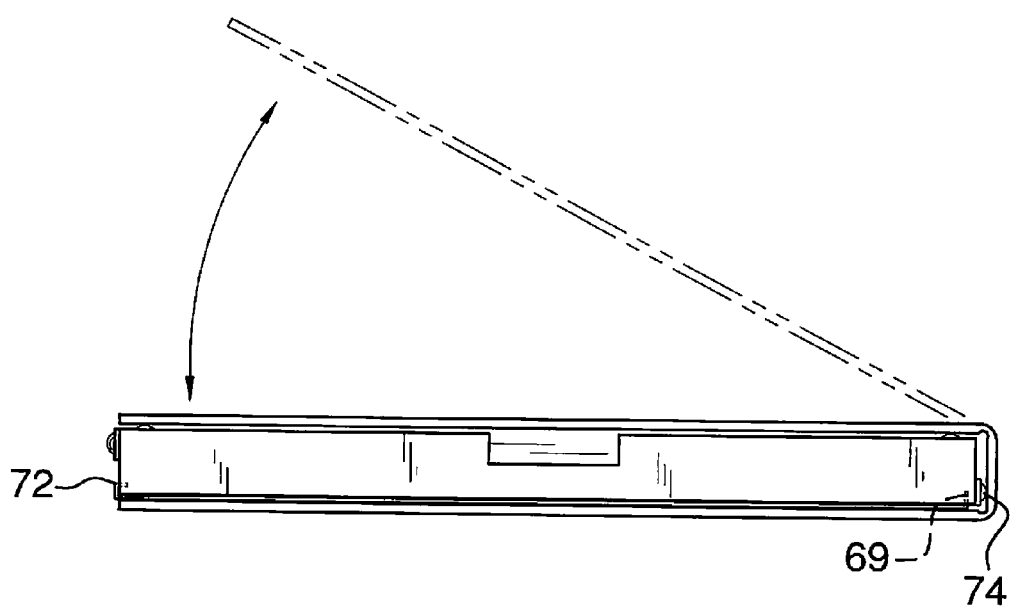
FIG. 13 is an end view of an embodiment of the disclosure.
Figure 14:
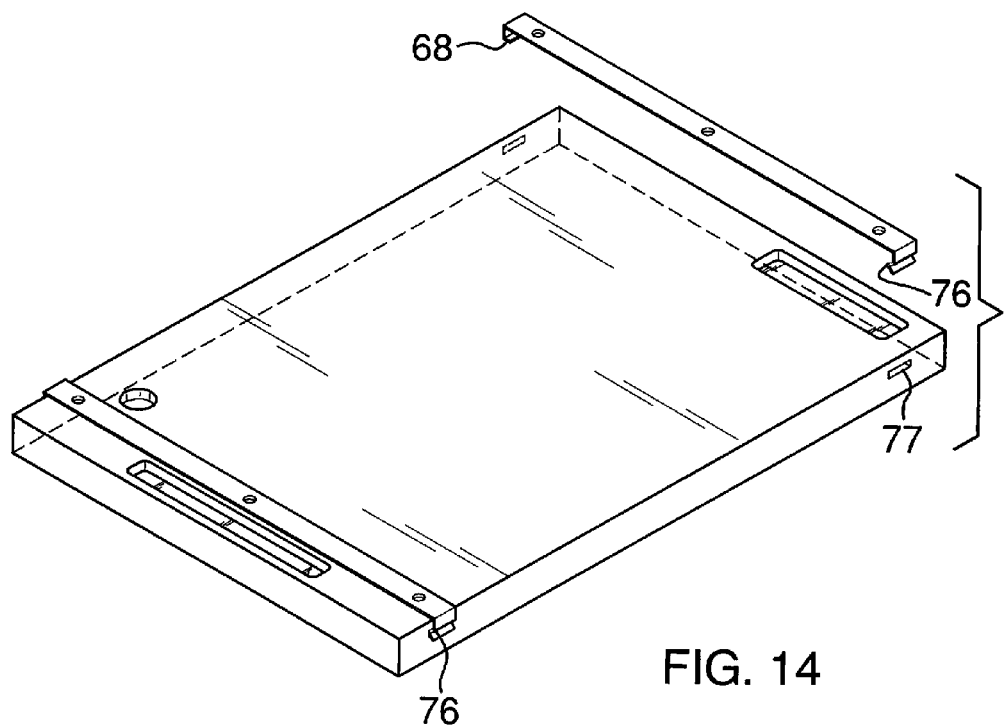
FIG. 14 is a bottom perspective view of an embodiment of the disclosure.

FIGS. 11 and 14 depict at least two different means for constructing the male and female mating members. FIG. 11, also shown in FIG. 9, includes male mating members wherein the first ends 68, 72 form a hook extendable into apertures in the perimeter wall 20 and the second ends 69, 73 is formed as a catch that is extendable into holes in the bottom side 15 and engaged with movable latches 74 including a spring 75 for retaining the latches 74 in engagement with the second ends 69, 73. FIG. 14 includes first ends 68, 72 also forming a hook, but a second end comprising a catch 76 biased toward the perimeter wall 20 to engage an indent 77 in the perimeter wall 20. The primary 66 and secondary 67 mounts are comprised of a metallic material or other rigid material what is resiliently flexible to allow the catch 76 to be pried outwardly from the indent 77.

A magnet 78 is positioned in the front cover 58. The magnet 78 is positioned to be positioned over the tablet computer 24 when the covering 55 is in the closed position. The magnet 78 signals the tablet computer 24 to enter a power saving mode since it is not viewable to the user.

In use, the tablet computer 24 is placed in the receiving space 22 and retained therein as described above. When turned on, sound emitted from the tablet computer 24 is directed outwardly through the channel and more particularly outwardly along the first 33, second 35 and third 35 arms. Moreover, the unique shape and placement of the arms 33-35 ensures that the sound volume is enhanced due to lack of extraneous sound wave collisions. It is for this reason that the channel 30 is bounded by walls having a convex curvature. The sound notches more particularly direct sound away from the panel 12 and toward a user facing the tablet computer 24. The covering 55 is used to protect the tablet computer 24 when not in use and the coupler 64 allows a person to easily remove the tablet computer receiver 56 from the covering as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A holding assembly for a tablet computer, said assembly comprising:
    a tablet computer receiver including;
        a panel having a top side, a bottom side, a first lateral edge, a second lateral edge, a first end edge and a second end edge; and
        a perimeter wall being attached to said top side and being coextensive with a perimeter edge of said panel, said perimeter wall extending around a receiving space configured for receiving a tablet computer, said perimeter wall having an interior surface, an exterior surface and an upper surface;
    a covering including a back cover, a front cover and a medial section being attached to and positioned between said front and back covers, said medial section being pivotable with respect to said front and back covers to facilitate closing or opening of said covering, said back cover and said front cover each having an inner surface and an outer surface, said inner surfaces facing each other when said covering is in said closed position;
    a coupler releasably coupling said tablet computer receiver to said back cover such that said bottom side faces said inner surface, said coupler comprising a mechanical coupler;
    wherein said coupler includes:
        a primary mount being attached to said inner surface of said back cover, said primary mount being non-removably coupled to said back cover;
        said tablet computer receiver including at least one primary female mating member being releasably engageable with said primary mount; and
        said primary mount being elongated and includes a first end and a second end, each of said first and second ends comprising a male mating member, said tablet computer receiver including a pair of primary female mating members releasably engaging said first and second ends of said primary mount.

2. The holding assembly according to claim 1, further including:
    a secondary mount being attached to said inner surface of said back cover, said primary mount being non-removably coupled to said back cover; and
    said tablet computer receiver including at least one secondary female mating member being releasably engageable with said secondary mount.

3. The holding assembly according to claim 2, wherein said secondary mount is elongated and includes a first end and a second end, each of said first and second ends of said secondary mount comprising a male mating member, said tablet computer receiver including a pair of secondary female mating members releasably engaging said first and second ends of said secondary mount.

4. The holding assembly according to claim 2, wherein each of said primary and secondary mounts is elongated along a line orientated perpendicular to a joining edge of said back cover and said medial section, said primary and secondary mounts being spaced from each other.

5. The holding assembly according to claim 2, wherein said primary and secondary mounts are positioned adjacent to opposite edges of said back cover with respect to each other.

6. The holding assembly according to claim 1, further including a magnet being positioned in said front cover, said magnet being positioned to be positioned over the tablet computer when said covering is in said closed position.

7. A holding assembly for a tablet computer, said assembly comprising:
    a tablet computer receiver including;
        a panel having a top side, a bottom side, a first lateral edge, a second lateral edge, a first end edge and a second end edge; and
        a perimeter wall being attached to said top side and being coextensive with a perimeter edge of said panel, said perimeter wall extending around a receiving space configured for receiving a tablet computer, said perimeter wall having an interior surface, an exterior surface and an upper surface;

a covering including a back cover, a front cover and a medial section being attached to and positioned between said front and back covers, said medial section being pivotable with respect to said front and back covers to facilitate closing or opening of said covering, said back cover and said front cover each having an inner surface and an outer surface, said inner surfaces facing each other when said covering is in said closed position;

a coupler releasably coupling said tablet computer receiver to said back cover such that said bottom side faces said inner surface, said coupler including;

a primary mount being attached to said inner surface of said back cover, said primary mount being non-removably coupled to said back cover;

said tablet computer receiver including at least one primary female mating member being releasably engageable with said primary mount;

said primary mount being elongated and including a first end and a second end, each of said first and second ends comprising a male mating member, said tablet computer receiver including a pair of primary female mating members releasably engaging said first and second ends of said primary mount;

a secondary mount being attached to said inner surface of said back cover, said primary mount being non-removably coupled to said back cover;

said tablet computer receiver including at least one secondary female mating member being releasably engageable with said secondary mount;

said secondary mount being elongated and including a first end and a second end, each of said first and second ends of said secondary mount comprising a male mating member, said tablet computer receiver including a pair of secondary female mating members releasably engaging said first and second ends of said secondary mount;

said primary and secondary mounts being elongated along a line orientated perpendicular to a joining edge of said back cover and said medial section, said primary and secondary mounts being spaced from each other, said primary and secondary mounts being positioned adjacent to opposite edges of said back cover with respect to each other; and a magnet being positioned in said front cover, said magnet being positioned to be positioned over the tablet computer when said covering is in said closed position.

8. A holding assembly for a tablet computer, said assembly comprising:

a tablet computer receiver including;

a panel having a top side, a bottom side, a first lateral edge, a second lateral edge, a first end edge and a second end edge; and a perimeter wall being attached to said top side and being coextensive with a perimeter edge of said panel, said perimeter wall extending around a receiving space configured for receiving a tablet computer, said perimeter wall having an interior surface, an exterior surface and an upper surface;

a covering including a back cover, a front cover and a medial section being attached to and positioned between said front and back covers, said medial section being pivotable with respect to said front and back covers to facilitate closing or opening of said covering, said back cover and said front cover each having an inner surface and an outer surface, said inner surfaces facing each other when said covering is in said closed position; and a coupler releasably coupling said tablet computer receiver to said back cover such that said bottom side faces said inner surface, said coupler comprising a mechanical coupler, wherein said coupler includes:

a primary mount being attached to said inner surface of said back cover, said primary mount being non-removably coupled to said back cover;

said tablet computer receiver including at least one primary female mating member being releasably engageable with said primary mount;

a secondary mount being attached to said inner surface of said back cover, said primary mount being non-removably coupled to said back cover;

said tablet computer receiver including at least one secondary female mating member being releasably engageable with said secondary mount;

wherein each of said primary and secondary mounts is elongated along a line orientated perpendicular to a joining edge of said back cover and said medial section, said primary and secondary mounts being spaced from each other.

9. The holding assembly according to claim 8, wherein said primary and secondary mounts are positioned adjacent to opposite edges of said back cover with respect to each other.

10. The holding assembly according to claim 8, further including a magnet being positioned in said front cover, said magnet being positioned to be positioned over the tablet computer when said covering is in said closed position.

\* \* \* \* \*